United States Patent
Chan et al.

(10) Patent No.: US 7,790,778 B2
(45) Date of Patent: *Sep. 7, 2010

(54) PREPOLYMER, POLYOL COMPOSITION AND PROCESS FOR MAKING A FLEXIBLE FOAM

(75) Inventors: Koon Yeow Chan, Brussels (BE); Eric Huygens, Heverlee (BE); Herman Eugene Germain Moureau, Tienen (BE); Anja Vanhalle, Everberg (BE); Jianming Yu, Brussels (BE)

(73) Assignee: Huntsman International LLC, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/047,088

(22) Filed: Jan. 31, 2005

(65) Prior Publication Data

US 2005/0176840 A1    Aug. 11, 2005

Related U.S. Application Data

(63) Continuation of application No. PCT/EP03/07053, filed on Jul. 2, 2003.

(51) Int. Cl.
*C08G 18/28* (2006.01)

(52) U.S. Cl. .............. 521/159; 521/130; 521/170; 521/174; 521/176

(58) Field of Classification Search ........... 521/130, 521/159, 170, 174, 176
See application file for complete search history.

(56) References Cited

U.S. PATENT DOCUMENTS

| | | | |
|---|---|---|---|
| 4,559,366 A | 12/1985 | Hostettler | |
| 5,063,253 A | 11/1991 | Gansen et al. | |
| 5,374,667 A | 12/1994 | Hinz et al. | |
| 5,459,170 A | 10/1995 | Bleys et al. | |
| 5,521,226 A * | 5/1996 | Bleys | 521/174 |
| 5,594,097 A | 1/1997 | Chaffanjon et al. | |
| 5,792,829 A | 8/1998 | Allen et al. | |
| 6,506,813 B1 * | 1/2003 | Parfondry et al. | 521/174 |
| 6,569,913 B1 * | 5/2003 | Huygens et al. | 521/159 |
| 6,579,912 B2 * | 6/2003 | Parfondry et al. | 521/174 |
| 6,590,008 B1 * | 7/2003 | Parfondry et al. | 521/174 |
| 6,593,387 B2 * | 7/2003 | Parfondry et al. | 521/174 |
| 6,617,369 B2 * | 9/2003 | Parfondry et al. | 521/174 |
| 6,774,153 B2 * | 8/2004 | Parfondry et al. | 521/130 |
| 6,784,217 B2 * | 8/2004 | Parfondry et al. | 521/130 |
| 6,919,384 B2 * | 7/2005 | Yu | 521/159 |
| 6,946,497 B2 * | 9/2005 | Yu | 521/174 |
| 2003/0105177 A1 | 6/2003 | Parfondry et al. | |

FOREIGN PATENT DOCUMENTS

| | | |
|---|---|---|
| EP | 0 557 792 | 9/1993 |
| EP | 0 609 982 | 8/1994 |
| WO | WO 94/24183 | 10/1994 |
| WO | WO 00/73362 | 12/2000 |
| WO | WO 01/32735 | 5/2001 |
| WO | WO 01/32736 | 5/2001 |
| WO | WO 01/60884 | 8/2001 |

OTHER PUBLICATIONS

Randall, David and Lee, Steve, Editors, the Huntsman Polyurethanes Book, 2002, pp. 93-95, John Wiley & Sons, Ltd.

* cited by examiner

*Primary Examiner*—John Cooney
(74) *Attorney, Agent, or Firm*—Nicole Graham

(57) ABSTRACT

Isocyanate-terminated prepolymer having an NCO-value of 5-30% by weight and being the reaction product of an excessive amount of diphenylmethane diisocyanate comprising at least 80% by weight of 4,4'-diphenylmethane diisocyanate and a polyoxyethylene-polyoxypropylene polyol having an average molecular weight of 2000-10000, an average nominal hydroxy functionality of 2-6, an oxyethylene content of 21-45% by weight and a structure of the type -PO-PO/EO-EO wherein the PO block comprises 60-90% of the PO and the ratio of tipped EO:random is 3:1 to 1:3, and a process for preparing a flexible foam by reacting in a mould and at an index of 70-120, the above prepolymer or a composition comprising this prepolymer and b1) a polyoxyethylene-polyoxypropylene polyol, having an average nominal hydroxy functionality of 2-6, and a oxyethylene (EO) content of more than 50% by weight; and optionally b2) a polyoxyethylene-polyoxypropylene polyol, having an average nominal hydroxy functionality of 2-6, an EO content of between 20-50% by weight and a primary hydroxy content of at least 50%, calculated on the number of primary and secondary hydroxyl groups; and c) water; and optionally d) additives and auxiliaries known per se.

19 Claims, No Drawings

PREPOLYMER, POLYOL COMPOSITION AND PROCESS FOR MAKING A FLEXIBLE FOAM

CROSS REFERENCE TO RELATED APPLICATIONS

This application is a continuation of international application PCT/EP2003/007053, filed Jul. 2, 2003, and further claims priority to EP02017372.0, filed Aug. 2, 2002.

FIELD OF THE INVENTION

The present invention concerns a prepolymer, a polyol composition, and a process for preparing a flexible polyurethane foam.

BACKGROUND OF THE INVENTION

WO 01/32735 relates to a process for making a foam using a prepolymer having an NCO value below 20% by weight. Such a process has as disadvantages that an extra production step is needed to make the prepolymer and that such prepolymers have often a higher viscosity, which may hamper the easiness to make the foams. Still further, the hardness of the foams is not high enough for foams having a relatively low hard-block content and a relatively high density.

WO 01/60884 relates to a process for preparing a flexible polyurethane foam using a high amount of a polyol having a high oxyethylene content and a high primary hydroxyl content together with a polyol with a medium oxyethylene content (see e.g. example 8). When the experiment was repeated in a closed mould no satisfactory foam was obtained.

WO 01/32736 relates to a process for preparing foams using similar polyols together with a polyol having a low oxyethylene content. The process is a one shot process or a prepolymer process wherein the prepolymer has a high NCO value. The foams obtained have visco-elastic properties.

U.S. Pat. Nos. 5,594,097 and 4,559,366 relate to the use of polyols having an intermediate amount of oxyethylene groups (i.e. from 20-50% by weight) in preparing flexible foams. U.S. Pat. No. 5,459,170 relates to prepolymers from such polyols.

SUMMARY OF THE INVENTION

Surprisingly, we now have found that flexible polyurethane foams with a better hardness/density/hard-block-content relation are obtainable with good further properties, like strength, compression set, creep properties, resilience, vibration transmissibility, elongation and a nice feel, by the following easily conductable process by using a special prepolymer and a polyoxyethylene polyoxypropylene polyol with a certain high oxyethylene content and optionally a polyol with a certain medium oxyethylene content and optionally a specific polyoxyethylene polyol.

Therefore, the present invention concerns a novel prepolymer, a composition of other polyisocyanates and this novel prepolymer, and a process for making flexible polyurethane foams by reacting this novel prepolymer or composition with a polyol and water.

DETAILED DESCRIPTION

The present invention concerns a novel prepolymer, a composition of other polyisocyanates and this novel prepolymer, and a process for making flexible polyurethane foams by reacting this novel prepolymer or composition with a polyol and water.

The prepolymer according to the present invention is an isocyanate-terminated prepolymer having an NCO-value of 5-30% by weight and preferably 5-19% by weight and being the reaction product of an excessive amount of diphenylmethane diisocyanate (MDI) comprising at least 80% (and preferably at least 90% by weight) of 4,4'-diphenylmethane diisocyanate and a polyoxyethylene-polyoxypropylene polyol having an average molecular weight of 2000-10000, an average nominal hydroxy functionality of 2-6, an oxyethylene content of 21-45% by weight and a structure of the type -PO-PO/EO-EO wherein the (first) PO block comprises 60-90% of the PO and the ratio of tipped EO: random EO is 3:1 to 1:3.

Such prepolymers are made in a conventional way by allowing the polyisocyanate and polyol to react at ambient or elevated temperature (e.g. up to 90° C.) and if desired in the presence of a catalyst. The MDI may be pure 4,4'-MDI or a mixture with 2,4'-MDI optionally together with minor amounts (less than 5% by weight) of 2,2'-MDI. The polyol used to make the prepolymer is also known in the art (see e.g. EP 609982). Preferably, the average molecular weight is 3000-9000 and the average nominal hydroxy functionality is 2-4.

The polyisocyanate composition according to the present invention is a composition of 1-99, preferably 5-95 and most preferably 10-90 parts by weight (pbw) of the prepolymer according to the present invention with 1-99, preferably 5-95, and most preferably 10-90 pbw of another polyisocyanate, calculated on 100 pbw of this polyisocyanate composition. The other polyisocyanate may be selected from aliphatic, cycloaliphatic and araliphatic polyisocyanates, especially diisocyanates, like hexamethylene diisocyanate, isophorone diisocyanate, cyclohexane-1,4-diisocyanate, 4,4'-dicyclohexylmethane diisocyanate and m- and p-tetramethylxylylene diisocyanate, and in particular aromatic polyisocyanates like tolylene diisocyanates (TDI), phenylene diisocyanates and most preferably diphenylmethane diisocyanates (MDI) having an isocyanate functionality of at least two. The diphenylmethane diisocyanates (MDI) may be selected from pure 4,4'-MDI, isomeric mixtures of 4,4'-MDI and 2,4'-MDI and less than 5% by weight of 2,2'-MDI, crude and polymeric MDI having isocyanate functionalities above 2, and modified variants of these MDIs containing urethane groups, obtained by reacting such MDIs with polyols having a molecular weight of at most 500, and/or carbodiimide and/or uretonimine groups, such variants having an NCO-value of at least 20% by weight and mixtures of such diphenylmethane diisocyanates having an isocyanate functionality of at least 2.

Examples of MDI, uretonimine/carbodiimide modified MDI, and polymeric MDI are SUPRASEC® MPR, 2020 and 2185 isocyanates, respectively, available from Huntsman Polyurethanes. The variants containing urethane groups are also widely known and commercially available. The compositions according to the present invention may be made by simple mixing, high shear mixing or in-line blending or any other way of mixing the ingredients.

In particular, prepolymers having a lower NCO-value (e.g. 5-19% by weight) may be mixed with such further polyisocyanates so as to prepare a prepolymer having a higher NCO-value, which is then used to prepare the foam.

The prepolymer and the composition according to the present invention are useful for making flexible polyurethane foams. Therefore, the present invention is further concerned with a process for preparing a flexible polyurethane foam by reacting in a mould and at an index of 70-120 and preferably of 80-105:

a) a prepolymer or composition according to the present invention;
b1) 30-100 parts by weight of a polyoxyethylene-polyoxypropylene polyol, having an average nominal hydroxy functionality of 2-6 and an oxyethylene (EO) content of more than 50% by weight;
b2) 0-70 parts by weight of a polyoxyethylene-polyoxypropylene polyol, having an average nominal hydroxy functionality of 2-6, an EO content of between 20-50% by weight and a primary hydroxy content of at least 50%, calculated on the number of primary and secondary hydroxyl groups in polyol b2), the amounts of b1) and b2) being calculated on 100 parts by weight of b1) and b2); and
c) water; and optionally
d) additives and auxiliaries known per se.

In the context of the present invention the following terms, if and whether they are used, have the following meaning:

1) isocyanate index or NCO index or index: the ratio of NCO-groups over isocyanate-reactive hydrogen atoms present in a formulation, given as a percentage:

$$\frac{[NCO] \times 100}{[active\ hydrogen]}\ (\%).$$

In other words, the NCO-index expresses the percentage of isocyanate actually used in a formulation with respect to the amount of isocyanate theoretically required for reacting with the amount of isocyanate-reactive hydrogen used in a formulation. It should be observed that the isocyanate index as used herein is considered from the point of view of the actual foaming process involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens reacted with isocyanate to produce modified polyols or polyamines, are not taken into account in the calculation of the isocyanate index. Only the free isocyanate groups and the free isocyanate-reactive hydrogens (including those of the water) present at the actual foaming stage are taken into account.

2) The expression "isocyanate-reactive hydrogen atoms" as used herein for the purpose of calculating the isocyanate index refers to the total of hydroxyl and amine hydrogen atoms present in the reactive compositions in the form of polyols, polyamines and/or water. This means that for the purpose of calculating the isocyanate index at the actual foaming process, one hydroxyl group is considered to comprise one reactive hydrogen, one primary or secondary amine group is considered to comprise one reactive hydrogen, and one water molecule is considered to comprise two active hydrogens.

3) Reaction system: a combination of components wherein the polyisocyanate component is kept in a container separate from the isocyanate-reactive components.

4) The expression "polyurethane foam" as used herein generally refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-polyurethane foams).

5) The term "average nominal hydroxyl functionality" is used herein to indicate the average functionality (number of hydroxyl groups per molecule) of a polyol on the assumption that this is the average functionality (number of active hydrogen atoms per molecule) of the initiator(s) used in their preparation although in practice the functionality of the polyol will often be somewhat less because of some terminal unsaturation. The average equivalent weight of a polyol is the average molecular weight divided by this average nominal hydroxyl functionality.

6) The term "average" is used to indicate an average by number.

7) The following way of describing polyols is used in the present application: A PO-EO polyol is a polyol having first a PO block attached to the initiator followed by an EO block (PO stands for oxypropylene and EO for oxyethylene). A PO-PO/EO polyol is a polyol having first a PO block and then a block of randomly distributed PO and EO. A PO-PO/EO-EO polyol is a polyol having first a PO block then a block of randomly distributed PO and EO and then a block of EO. A PO-EO polyol is a polyol having first a PO block and then an EO block. In the above descriptions only one tail of a polyol is described (seen from the initiator); the nominal hydroxy functionality will determine how many of such tails will be present.

Polyol b1 is an EO rich polyol. It can be prepared by known methods. It comprises PO and EO, where the EO can be random, tipped, or both. Preferably, the EO is random in majority. The EO content is greater than 50% by weight and preferably 60-90% by weight calculated on the weight of the polyol. Preferably, the average nominal hydroxy functionality is 2-4. The average molecular weight may range from 2000-10000, preferably from 3000-8000. Examples of useful polyols are DALTOCEL® F442, F444 and F555 polyols (all available from Huntsman Polyurethanes).

Polyol b2, when used, preferably has a structure of the type PO-PO/EO-EO, PO/EO-EO or PO-EO. The total EO content is between 20-50% by weight and preferably from 21 to 45% calculated on the weight of the polyol. Polyol b2 has a primary OH content of at least 50%, preferably at least 70%. In the PO-PO/EO-EO type polyol, which is the most preferred one, the (first) PO block comprises preferably from 60 to 90% by weight of the PO and the weight ratio of tipped EO and random EO preferably is from 1:3 to 3:1. The polyol having a structure of the type PO-PO/EO-EO can notably be produced according to the teaching of Chaffanjon et al., U.S. Pat. No. 5,594,097. The polyol having a structure of the type -PO/EO-EO can notably be produced according to the teaching of Hostettler, U.S. Pat. No. 4,559,366. The average nominal hydroxy functionality preferably is 2-4. The average molecular weight may range from 2000-10000 and preferably from 3000-9000.

Preferably, no polyols are used that have an average molecular weight of 2000 or more and an oxyethylene content of less than 20% by weight.

Water is used as the blowing agent. Carbon dioxide may be added if needed. It is appropriate to use from 1 to 10%, preferably from 1 to 5%, by weight of water based on the weight of the total polyol component (pre-reacted and not pre-reacted, i.e. the total starting polyol compounds).

Other conventional ingredients (additives and/or auxiliaries) may be used in making the polyurethanes. These include catalysts (for example, tertiary amines and organic tin compounds), surfactants, cross linking or chain extending agents (for example, low molecular weight compounds such as diols, triols and diamines), flame proofing agents (for example, halogenated alkyl phosphates), fillers and pigments. Foam stabilizers, for example polysiloxane-polyalkylene oxide block copolymers, may be used to stabilize or regulate the cells of the foam. The amount of other isocyanate-reactive ingredients other than polyols b1) and b2) and water preferably is less than 15% and more preferably less than 10% by weight calculated on the weight of polyol b1)+b2).

The amount of these minor ingredients used will depend on the nature of the product required and may be varied within limits well known to a polyurethane foam technologist.

The components of the polyurethane forming reaction mixture may be mixed together in any convenient manner. They may be pre-blended so as to reduce the number of component streams to be brought together in the final mixing step. It is often convenient to have a two-stream system whereby one stream comprises the prepolymer or polyisocyanate composition and the second stream comprises all the other components of the reaction mixture. All the other components may also be led to the mixing head of the foaming machine independently.

The foams may be used in the furniture and automotive industries in seating, steering wheels, dash boards, cushioning and mattresses, and for sound damping and insulation.

The foams thus obtained have an overall density of 15-140 kg/m$^3$, preferably 30-110 kg/m$^3$ (ISO 845).

Foams made from a prepolymer or composition according to the present invention show a better stability than foams made according to the one-shot process and show a higher hardness than foams made from prepolymers based on polyol b1.

The process may be conducted in any type of mould known in the art. Preferably, the process is conducted in a closed mould. Examples of such moulds are the moulds commercially used for making polyurethane furniture parts, automotive seating and other automotive parts, like arm-rests and head-rests. The moulding process is a so-called cold-cure moulding process wherein the ingredients used for making the foam are fed into the mould at a temperature of from ambient temperature up to 80° C. and preferably up to 55° C., the mould being kept at a temperature of from ambient temperature up to 80° C., and preferably, up to 55° C. during the process. After demoulding, the foams are optionally cured for a period of 1 hour to 2 days at a temperature of ambient to 100° C., and preferably, of ambient temperature to 70° C.

The process according to the present invention may be conducted as a so-called foam-in-fabric (FIF) process (or also called pour-in-place process). According to this process, the ingredients to make the foam are poured into a mould containing an upholstery material or outer layer, such as rayon, vinyl, treated natural fibres and the like. A major problem with this approach is that the reacting liquid urethane mixture can strike through or penetrate the upholstery material while the latter is conforming to the shape of the mould, and thus to the shape of the desired composite article. "Strike-through" is a problem because the reacting polyurethane mixture is poured inside the upholstery where the foaming action moves it, under pressure, toward the walls of the mould. Because of the pressure exerted on the upholstery, the urethane mixture is prone to penetrate the upholstery material and result in a defective article. Often a thin foam barrier is used in place between the foam and the upholstery. However, penetration of the foam barrier is also not preferred since even though such strike-through is not visible, there is a harsh feeling to the touch at the point of penetration.

Also, often an impermeable film is used between the upholstery material and the thin foam barrier. By using the ingredients according to the present invention in this pour-in-place technique, no such film is needed and no or less strike-through is observable. Therefore, the process according to the present invention advantageously is conducted in a mould comprising an upholstery material.

Conventional polyurethane systems that use primarily polyether polyols comprising predominantly oxypropylene groups normally need a barrier film certainly at higher overpack; surprisingly, the present systems can do without barrier films. The overpack in the present foam in fabric process preferably is 5-100 and more preferably 10-50%. In particular, the use of the prepolymer based on the polyol of the type PO-PO/EO-EO allows a higher overpack without observing too severe penetration when using the foam-in-fabric technique.

Because the foams according to the present invention can be easily demoulded without applying external mould release after the first part has been made, the process for preparing the flexible polyurethane foam in a closed mould may be conducted according to the following steps:

1. an external mould release agent is applied onto at least those surfaces of the mould that will be in contact with the ingredients used for preparing the foam and/or the finished foam;
2. the ingredients to be used for preparing the foam are fed into the mould;
3. the ingredients are allowed to react and to form the polyurethane foam, which reaction comprises reacting the ingredients described before;
4. the polyurethane foam so formed is removed from the mould; and
5. steps 2, 3 and 4 are repeated at least 10 times without repeating step 1.

The foams obtained have comparable physical properties irrespective of whether the foam is obtained after steps 2, 3, and 4 have been conducted once, 10 times, 25 times, 40 times or even more.

The mould may be closed after step 2 and opened after step 3 or the mould may be closed after step 1 and opened after step 3; in the latter case, the ingredients for making the foam are fed into the mould via appropriate inlets.

The material of the mould may be selected from those known in the art like metal (e.g. steel, aluminium, and epoxy resin).

Step 1 of the process may be conducted in any way known in the art. Applying an external mould release agent on the surfaces of a mould, which surfaces will be in contact with the ingredients used for making the material and/or with the material includes any way of applying such an agent to the surfaces, like rubbing, brushing, spraying and combinations thereof and applying any agent or agents intended to facilitate the later demoulding. One or more external mould release agents may be used as well as mixtures of external release agents.

The external mould release agents may be applied as such or as a solution, emulsion or dispersion in a liquid.

The external mould release agents, applied in step 1, may be applied in one or more stages. Any external mould release agent known in the art may be applied. Examples of suitable external mould release agents are Kluberpur 41-0039 and 41-0061 mould release agents (both from Kluber Chemie), Desmotrol D-10RT mould release agents from Productos Concentrol SA, Acmosil 180 STBH mould release agents from Fuller, and Johnson Cire 103 mould release agents from Johnson and Johnson.

The invention is illustrated by the following non-limiting examples:

EXAMPLES

Example 1

72 parts by weight (pbw) of polyol 1 was heated to about 45° C. and added to a mixture of 28 pbw of SUPRASEC® MPR isocyanate and about 10 ppm of thionylchloride which mixture was kept at about 50° C. Then the reaction was allowed to proceed while keeping the temperature at 85° C. for about 3½ hours. Subsequently, the prepolymer obtained was allowed to cool to ambient temperature. The prepolymer (hereinafter "Prepolymer 1") had an NCO-value of about 7.8% by weight.

Polyol 1 is a polyol with the structure PO-PO/EO-EO which is glycerol-initiated and has an OH-value of 28 mg KOH/g and a weight distribution of about 55-15/15-15 respectively.

Example 2

Polyisocyanate compositions according to the present invention were made by mixing the following polyisocyanates (amounts are in pbw).

| Polyisocyanate composition | 1 | 2 | 3 | 4 | 5 |
|---|---|---|---|---|---|
| Prepolymer 1 | 36.3 | 20.9 | 50.6 | 27.2 | 48.4 |
| SUPRASEC ® 2020 isocyanate | 12.1 | 11.1 | 4.8 | 30.8 | 20.8 |
| SUPRASEC ® MPR isocyanate | 8.9 | 11.1 | 7.6 | 30.8 | 20.8 |
| SUPRASEC ® 2185 isocyanate | 3.4 | 1.1 | 1.2 | 11.1 | 10.0 |

Example 3

Moulded flexible foams were made from the compositions of example 2 and the following further ingredients, which were premixed before being brought in contact with the polyisocyanates. The mould temperature was 45-50° C., the temperature of the chemicals before mixing was 27° C. After feeding the mixture into the mould, the mould was closed. The mould size was 45×45×10 cm and the amount of overpack was about 50%. The ingredients and the physical properties of the moulded foams obtained are given in the table below.

| Foam | 1 | 2 | 3 | 4 | 5 |
|---|---|---|---|---|---|
| Polyisocyanate composition | 1 | 2 | 3 | 4 | 5 |
| Polyol 2 | — | — | 33.6 | 62.9 | 95 |
| Polyol 3 | 36.5 | 43.5 | — | — | — |
| Polyol 1 | — | 10 | — | 32.1 | — |
| ZF22 | 0.06 | 0.04 | 0.06 | — | — |
| DABCO 33 LV catalyst | 0.45 | 0.4 | 0.4 | — | — |
| B8715 LF | 0.25 | 0.15 | 0.15 | 0.45 | 0.5 |
| water | 2.04 | 1.64 | 1.54 | 3.60 | 3.43 |
| D8154 | — | — | — | 0.53 | 0.6 |
| DMEA | — | — | — | 0.27 | 0.3 |
| DMAPA | — | — | — | 0.16 | 0.2 |
| core density, kg/m$^3$, ISO 845 | 57 | 69 | 68 | 59 | — |
| transmissibility at resonance, JASO B407-82 | 3.1 | 3.0 | 3.2 | — | — |
| Indentation load deflection, N/$_{314}$cm$^2$, at 25%, ISO 2439 | 265 | 246 | 236 | — | — |
| Creep (compression load deflection 40%), kPa | 8.5 | — | 9.8 | 8.3 | — |

Polyol 2: is a polyoxyethylene polyoxypropylene polyol having a nominal functionality of 3, an OH-value of 38 mg KOH/g and an EO content of about 75% by weight (all random).
Polyol 3: as Polyol 2 with the proviso that the OH-value is 28 mg KOH/g.
ZF22: JEFFCAT ® ZF22 catalyst obtainable from Huntsman.
DABCO 33 LV catalyst: catalyst obtainable from Air Products
B8715LF: TEGOSTAB 8715 LF surfactant from Goldschmidt
D8154: Blend of tertiary amine catalyst and organic acid catalyst available from Air Products.
DMEA: dimethyl ethanolamine catalyst.
DMAPA: dimethylamino-propylamine catalyst.

What is claimed is:

1. A process for preparing a flexible polyurethane foam, comprising:
   a pour-in-place-process reaction of a composition in a mould, the composition comprising:
   a polyisocyanate composition comprising:
   1-99 parts by weight of an isocyanate-terminated prepolymer having an NCO-value of 5-30% by weight and being the reaction product of:
   an excessive amount of diphenylmethane diisocyanate comprising at least 80% by weight of 4,4'-diphenylmethane diisocyanate, and
   a first polyoxyethylene-polyoxypropylene polyol having an average molecular weight of 2000-10000, an average nominal hydroxy functionality of 2-6, an oxyethylene content of 21-45% by weight and from two to six -PO-PO/EO-EO tail structures connected to an initiator, wherein each structure linked to said initiator is a -PO-PO/EO-EO structure consisting of a first block of PO that is attached to the initiator, the first block comprises 60-90% of the PO, a second block of randomly distributed PO and EO connected to the PO block, and a third block of EO connected to the block of randomly distributed PO and EO that is the terminus of the -PO-PO/EO-EO structure, the ratio of third block EO to random EO being 3:1 to 1:3; and
   1-99 parts by weight of an other polyisocyanate, calculated on 100 parts by weight of the polyisocyanate composition;
   30-100 parts by weight of a second polyoxyethylene-polyoxypropylene polyol having an average nominal hydroxyl functionality of 2-6 and an oxyethylene (EO) content of more than 50% by weight;
   0-70 parts by weight of a third polyoxyethylene-polyoxypropylene polyol having an average nominal hydroxy functionality of 2-6, an EO content of between 20-50% by weight and a primary hydroxyl content of at least 50%, calculated on the number of primary and secondary hydroxyl groups therein, and wherein the amounts of the second polyoxyethylene-polyoxypropylene polyol and the third polyoxyethylene-polyoxypropylene polyol being calculated on 100 parts by weight of the second polyoxyethylene-polyoxypropylene polyol and the third polyoxyethylene-polyoxypropylene polyol; and
   a blowing agent comprising water, wherein the mould has a foam barrier disposed on an outer layer and there is an absence of penetration of the outer layer by the flexible polyurethane foam.

2. The process according to claim 1, wherein the polyisocyanate composition comprises 10-90 parts by weight of the isocyanate-terminated prepolymer and 10-90 parts by weight of the other polyisocyanate.

3. The process according to claim 1, wherein the other polyisocyanate is selected from the group consisting of: 1) diphenylmethane diisocyanates (MDI), 2) crude MDI, 3) polymeric MDI, 4) modified variants of these MDIs containing urethane groups, obtained by reacting these MDIs with polyols having a molecular weight of at most 500, and/or carbodiimide groups, and/or uretonimine groups, such variants having an NCO-value of at least 20% by weight, and 5) mixtures of any of 1) through 4).

4. The process according to claim 2, wherein the other polyisocyanate is selected from the group consisting of: 1) diphenylmethane diisocyanates (MDI), 2) crude MDI, 3) polymeric MDI, 4) modified variants of these MDIs containing urethane groups, obtained by reacting these MDIs with polyols having a molecular weight of at most 500, and/or carbodiimide groups, and/or uretonimine groups, such variants having an NCO-value of at least 20% by weight, and 5) mixtures of any of 1) through 4).

5. A process for preparing a flexible polyurethane foam, comprising:
a pour-in-place-process reaction of a composition in a mould and at an index of 70-120, the composition comprising:
a) an isocyanate-terminated prepolymer having an NCO-value of 5-30% by weight and being the reaction product of:
(i) an excessive amount of diphenylmethane diisocyanate comprising at least 80% by weight of 4,4'-diphenylmethane diisocyanate, and
(ii) a polyoxyethylene-polyoxypropylene polyol having an average molecular weight of 2000-10000, an average nominal hydroxy functionality of 2-6, an oxyethylene content of 21-45% by weight and from two to six -PO-PO/EO-EO tail structures, each -PO-PO/EO-EO tail structure of said polyol consisting of a PO first block linked to an initiator, a second block of randomly distributed PO and EO linked to the PO first block, and a third block of EO linked to the second block of randomly distributed PO and EO and that the EO third block comprises the end of the tail structure, the first block of PO containing 60-90% of the PO and the ratio of third block EO to random EO is 3:1 to 1:3;
or a polyisocyanate composition comprising:
(i) 1-99 parts by weight of an isocyanate-terminated prepolymer having an NCO-value of 5-30% by weight and being the reaction product of:
(A) an excessive amount of diphenylmethane diisocyanate comprising at least 80% by weight of 4,4'-diphenylmethane diisocyanate, and
(B) a polyoxyethylene-polyoxypropylene polyol having an average molecular weight of 2000-10000, an average nominal hydroxy functionality of 2-6, an oxyethylene content of 21-45% by weight and from two to six -PO-PO/EO-EO tail structures, each -PO-PO/EO-EO tail structure of said polyol consisting of a PO first block linked to an initiator, a second block of randomly distributed PO and EO linked to the PO first block, and an EO third block linked to the second block of randomly distributed PO and EO and that the EO third block comprises the end of the tail structure, the first block of PO containing 60-90% of the PO and the ratio of third block EO to random EO is 3:1 to 1:3; and (ii) 1-99 parts by weight of an other polyisocyanate, calculated on 100 parts by weight of the polyisocyanate composition;
b1) 30-100 parts by weight of a polyoxyethylene-polyoxypropylene polyol having an average nominal hydroxy functionality of 2-6 and an oxyethylene (EO) content of more than 50% by weight;
b2) 0-70 parts by weight of a polyoxyethylene-polyoxypropylene polyol having an average nominal hydroxy functionality of 2-6, an EO content of between 20-50% by weight and a primary hydroxy content of at least 50%, calculated on the number of primary and secondary hydroxyl groups in polyol b2), the amounts of b1) and b2) being calculated on 100 parts by weight of b1) and b2); and
c) water; and optionally;
d) additives and auxiliaries known per se, wherein the mould has a foam barrier disposed on an outer layer and there is an absence of penetration of the outer layer by the flexible polyurethane foam.

6. The process according to claim 5 wherein polyol b2) has the structure PO-EO/PO-EO wherein the PO block comprises 60-90% by weight of the PO and wherein the weight ratio of third block EO to random EO is 1:3 to 3:1.

7. The process according to claim 5, wherein no polyol is used that has an average molecular weight of 2000 or more and an oxyethylene of less than 20% by weight.

8. The process according to claim 6, wherein no polyol is used that has an average molecular weight of 2000 or more and an oxyethylene of less than 20% by weight.

9. The process according to claim 5, wherein the process is conducted in a closed mould.

10. The process according to claim 6, wherein the process is conducted in a closed mould.

11. The process according to claim 7, wherein the process is conducted in a closed mould.

12. The process according to claim 8, wherein the process is conducted in a closed mould.

13. The process of claim 1 wherein the polyoxyethylene-polyoxypropylene polyol reacted with the diphenylmethane diisocyanate is the sole polyol to react with the diphenylmethane diisocyanate to produce said prepolymer.

14. The process according to claim 1, wherein the polyoxyethylene-polyoxypropylene polyol having EO content of between 20-50% by weight comprises an average molecular weight of 2000-10000, an average nominal hydroxy functionality of 2-6, an oxyethylene content of 21-45% by weight and from two to six -PO-PO/EO-EO tail structures connected to an initiator, wherein each structure linked to said initiator is a -PO-PO/EO-EO structure consisting of a first block of PO that is attached to the initiator, the first block comprises 60-90% of the PO, a second block of randomly distributed PO and EO connected to the PO block, and a third block of EO connected to the block of randomly distributed PO and EO that is the terminus of the -PO-PO/EO-EO structure, the ratio of third block EO to random EO being 3:1 to 1:3.

15. The process according to claim 1, wherein the flexible polyurethane foam comprises an overpack from 5% to 100%.

16. The process according to claim 1, wherein the mould comprises an upholstery material.

17. The process according to claim 5, wherein the mould comprises an upholstery material.

18. The process according to claim 5, wherein the mould has an outer layer.

19. The process according to claim 5, wherein the flexible polyurethane foam comprises an overpack from 5% to 100%.

* * * * *